US012677891B2

(12) United States Patent
Kishihara

(10) Patent No.: US 12,677,891 B2
(45) Date of Patent: Jul. 14, 2026

(54) GLOVE AND METHOD FOR MANUFACTURING GLOVE

(71) Applicant: SHOW GLOVE CO., Himeji (JP)

(72) Inventor: Hidetoshi Kishihara, Himeji (JP)

(73) Assignee: SHOWA GLOVE CO., Himeji (JP)

( * ) Notice: Subject to any disclaimer, the term of this patent is extended or adjusted under 35 U.S.C. 154(b) by 441 days.

(21) Appl. No.: 17/959,704

(22) Filed: Oct. 4, 2022

(65) Prior Publication Data

US 2023/0165329 A1 Jun. 1, 2023

(30) Foreign Application Priority Data

Nov. 30, 2021 (JP) ................................. 2021-194805

(51) Int. Cl.

| | |
|---|---|
| *A41D 19/00* | (2006.01) |
| *A41D 31/02* | (2019.01) |
| *B32B 7/12* | (2006.01) |
| *B32B 25/10* | (2006.01) |
| *B32B 37/12* | (2006.01) |

(52) U.S. Cl.
CPC ......... *A41D 19/0006* (2013.01); *A41D 31/02* (2013.01); *B32B 7/12* (2013.01); *B32B 25/10* (2013.01); *B32B 37/1284* (2013.01); *A41D 2500/50* (2013.01); *B32B 2037/1215* (2013.01); *B32B 2250/02* (2013.01); *B32B 2307/54* (2013.01); *B32B 2307/7376* (2023.05); *B32B 2437/02* (2013.01)

(58) Field of Classification Search
CPC ........... B32B 7/12; B32B 27/12; B32B 25/10; B32B 2037/1215; B32B 2437/02; B32B 2255/28; A41D 19/0006; A41D 19/0065
See application file for complete search history.

(56) References Cited

U.S. PATENT DOCUMENTS

| | | |
|---|---|---|
| 8,367,168 B2 | 2/2013 | Flather et al. |
| 2011/0179549 A1* | 7/2011 | Zaggl ...................... B32B 9/048 |
| | | 2/163 |

(Continued)

FOREIGN PATENT DOCUMENTS

| | | |
|---|---|---|
| JP | 2008-514467 A | 5/2008 |
| JP | 2012-500907 A | 1/2012 |
| WO | WO-2012094264 A2 * | 7/2012 ............... B32B 5/26 |

OTHER PUBLICATIONS

"New Edition, Basics of Rubber Technology" (published by The Society of Rubber Science and Technology, Japan), Described in p. 7 of the Specification.

*Primary Examiner* — Jennifer A Gillett
(74) *Attorney, Agent, or Firm* — Norris McLaughlin, P.A.

(57) ABSTRACT

An object of the present invention is to provide a glove in which a glove main body and a film are less likely to peel from each other even when a load, especially a torsional load, is applied. A glove according to an aspect of the present invention includes: a glove main body made of fibers; a film which covers at least a part of an outer face of the glove main body and contains a rubber or a resin as a principal component; and an adhesive portion which bonds the glove main body and the film together, wherein the adhesive portion includes: a pressure-sensitive adhesive layer in contact with the film; and an adhesive layer which is in contact with the glove main body and is constituted by a hot-melt adhesive.

3 Claims, 3 Drawing Sheets

(56) References Cited

U.S. PATENT DOCUMENTS

| | | | | |
|---|---|---|---|---|
| 2016/0230047 A1* | 8/2016 | Varn | .......................... | C09J 7/21 |
| 2017/0157901 A1* | 6/2017 | Uchida | .................. | D04H 1/492 |
| 2018/0154622 A1* | 6/2018 | Howland | .................. | B32B 1/00 |

* cited by examiner

GLOVE AND METHOD FOR MANUFACTURING GLOVE

BACKGROUND OF THE INVENTION

Field of Invention

The present invention relates to a glove and a method for manufacturing a glove.

Description of the Related Art

For example, as a glove for use in industrial environments such as civil engineering work and the like, and work in a cold region, a glove is known which includes: a glove main body made of fibers; and a film which covers an outer face of the glove main body and contains a rubber or a resin as a principal component.

The glove can be manufactured, for example, by bonding the glove main body and the film with an adhesive (see Japanese Unexamined Patent Application (Translation of PCT Application), Publication No. 2008-514467). According to the above publication, the glove main body and the film have different stretching properties, and thus non-adhesive bonding is formed so that the glove main body supports the film and limits stretchability thereof, thereby inhibiting peeling between an adhesive layer and the film and/or the glove main body. Specifically, as the adhesive, an adhesive which is cross-linked when exposed to moisture, namely polyurethane containing isocyanate, is preferred.

PRIOR ART DOCUMENTS

Patent Documents

Patent Document 1: Japanese Translation of PCT International Application, Publication No. 2008-514467

SUMMARY OF THE INVENTION

However, a glove is moved in accordance with the movement of the user's hand, and thus, even in the conventional glove using the above-mentioned adhesive, peeling between the glove main body and the film is likely to occur when a load, especially a torsional load, is applied. Therefore, a glove in which peeling is more unlikely to occur has been demanded.

The present invention has been made in view of the aforementioned circumstances, and an object of the invention is to provide a glove in which a glove main body and a film are less likely to peel from each other even when a load, especially a torsional load, is applied, and a method for manufacturing the glove.

A glove according to an aspect of the present invention includes: a glove main body made of fibers; a film which covers at least a part of an outer face of the glove main body and contains a rubber or a resin as a principal component; and an adhesive portion which bonds the glove main body and the film together, wherein the adhesive portion includes: a pressure-sensitive adhesive layer in contact with the film; and an adhesive layer which is in contact with the glove main body and is constituted by a hot-melt adhesive.

In the glove, the pressure-sensitive adhesive layer bonds the adhesive portion and the film together. The pressure-sensitive adhesive layer is superior in terms of pressure-sensitive adhesive strength with respect to the film, and readheres thereto even after peeling, thereby easily maintaining adhesion between the film and the adhesive portion. On the other hand, in the glove, since the hot-melt adhesive is used to bond the glove main body, which is difficult to bond with the pressure-sensitive adhesive, adhesive strength between the glove main body and the adhesive portion can be increased. Accordingly, in the glove, the glove main body and the film are less likely to peel from each other even when a load, especially a torsional load, is applied.

It is preferred that the adhesive portion does not include another layer between the pressure-sensitive adhesive layer and the adhesive layer. By thus not including another layer between the pressure-sensitive adhesive layer and the adhesive layer of the adhesive portion, flexibility of the glove can be increased while maintaining the adhesive strength. Furthermore, the glove is improved in followability and thus becomes resistant to a torsional load.

An average thickness of the pressure-sensitive adhesive layer is preferably no less than 20 $\mu$m and no greater than 200 $\mu$m, and an average thickness of the adhesive layer is preferably no less than 20 $\mu$m and no greater than 200 $\mu$m. By setting the average thickness of the pressure-sensitive adhesive layer and the average thickness of the adhesive layer to fall within the above-mentioned ranges, the adhesive strength can be increased while maintaining the flexibility of the glove.

A ratio of the average thickness of the pressure-sensitive adhesive layer to the average thickness of the adhesive layer is preferably no less than 0.3 and no greater than 1.5. By thus setting the ratio of the average thicknesses to fall within the above-mentioned range, the flexibility of the glove can be increased.

The pressure-sensitive adhesive layer preferably contains a film component which forms the rubber or the resin being the principal component of the film, and a content of the film component in the pressure-sensitive adhesive layer is preferably no less than 10% by mass and no greater than 60% by mass. When the component identical to the principal component of the film is thus contained in the pressure-sensitive adhesive layer within the above-mentioned range, the pressure-sensitive adhesive strength with respect to the film can be increased. It is to be noted that the "film component which forms the rubber" as referred to herein means a polymerized rubber itself, as well as a monomer of a rubber before polymerization and a mixture thereof. The same applies to the "film component which forms the resin" as referred to herein.

An other aspect of the present invention is a method for manufacturing a glove, the glove including: a glove main body made of fibers; a film which covers at least a part of an outer face of the glove main body and contains a rubber or a resin as a principal component; and an adhesive portion which bonds the glove main body and the film together, the method including: applying a pressure-sensitive adhesive composition to an inner face of the film, and drying the pressure-sensitive adhesive composition; applying a hot-melt adhesive to a surface of a pressure-sensitive adhesive layer having been formed in the applying and drying, and heating the hot-melt adhesive; overlaying the film and the glove main body after the applying and heating; and bonding the film and the glove main body together by heating after the overlaying.

In the method for manufacturing a glove, since the hot-melt adhesive is used to bond the glove main body, which is difficult to bond with the pressure-sensitive adhesive, the adhesive strength between the glove main body and the adhesive layer can be increased. Accordingly, in a glove manufactured by the method for manufacturing a glove, peeling is less likely to occur even when a load, especially a torsional load, is applied.

The "principal component" as referred to herein means a component having the highest content, for example, a component having a content of no less than 50% by mass. Furthermore, the "average thickness" as referred to herein means an arithmetic mean of thicknesses determined as follows: a cross section of a test piece which is cut out from a site including a measurement object is observed at 100-fold magnification, and the thickness of the test piece is measured at 20 points within a width of 2 mm at intervals of 100 μm by using a digital microscope (for example, "VHX-6000," manufactured by KEYENCE CORPORATION). It is to be noted that in a case in which the measurement object of the "average thickness" is present in a smooth part around 50 mm from a lower end of a cuff portion of the glove toward a fingertip side, the test piece is preferably cut out from the smooth part.

The "pressure-sensitive adhesive" as referred to herein means a material which contains no or only a small amount of a cross-linker, has a tack property (stickiness of an adhesive surface) even after the elapse of a long period of time, and shows a gum-like state, i.e., an intermediate state between solid and liquid, at room temperature (for example, 25° C.), and is a substance having a property of adhering to an object by pressure. In general, the pressure-sensitive adhesive satisfies a complex tensile elastic modulus E* (1 Hz)<10$^7$ dyne/cm$^2$ at 25° C.

Effects of the Invention

As described above, in the glove of the present invention, the glove main body and the film are less likely to peel from each other even when a load, especially a torsional load, is applied. Furthermore, the method for manufacturing a glove of the present invention enables manufacturing a glove in which the glove main body and the film are less likely to peel from each other even when a load, especially a torsional load, is applied.

DESCRIPTION OF THE PREFERRED EMBODIMENTS

Figure 1:
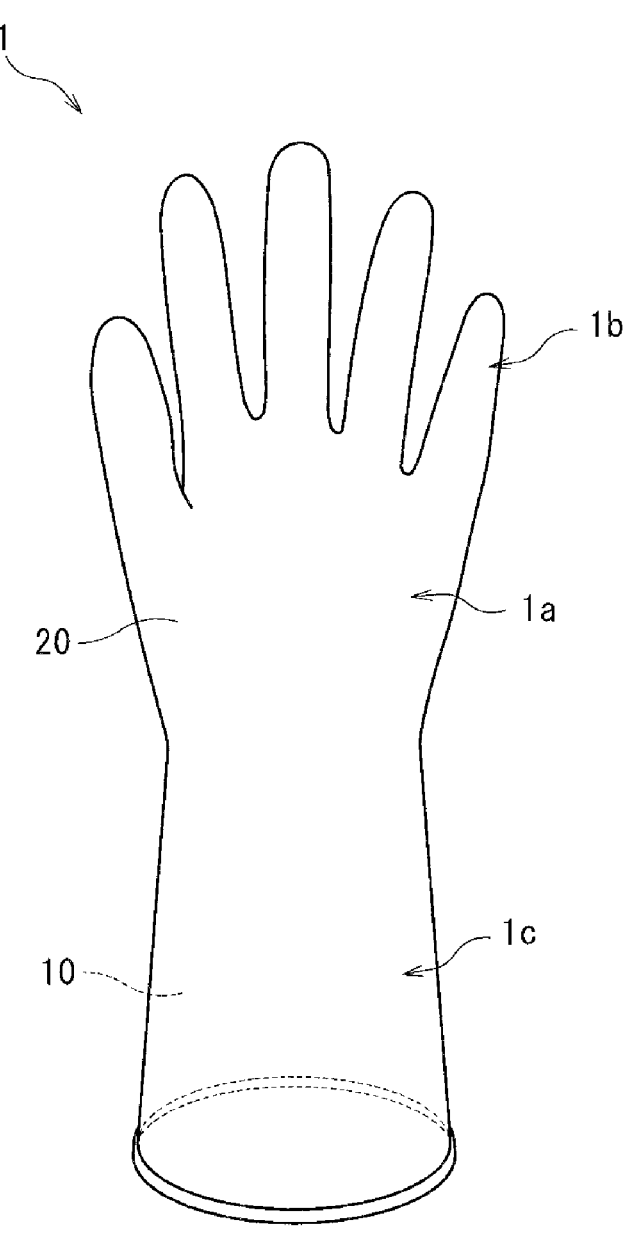
FIG. 1 is a schematic front view from a palm side of a glove according to one embodiment of the present invention.

Hereafter, a glove according to one embodiment of the present invention and a method for manufacturing the glove are described in detail.
Glove
A glove 1 illustrated in FIGS. 1 and 2 includes: a glove main body 10 made of fibers; a film 20 which covers at least a part of an outer face of the glove main body 10 and contains a rubber or a resin as a principal component; and an adhesive portion 30 which bonds the glove main body 10 and the film 20 together.
Both the glove main body 10 and the film 20 include: a main body portion 1a formed into a bag shape so as to cover a wearer's palm and dorsal hand; bottomed cylindrical first to fifth finger portions 1b extending from the main body portion 1a so as to cover the wearer's first to fifth fingers, respectively; and a cylindrical cuff portion 1c extending in a direction opposite to the first to fifth finger portions 1b. That is to say, in the glove 1 illustrated in FIGS. 1 and 2, the glove main body 10 and the film 20 have a substantially identical shape. As illustrated in FIG. 2, the adhesive portion 30 is preferably but not necessarily provided in an entirety of a region in which the glove main body 10 and the film 20 face each other, and a configuration may be employed in which the adhesive portion 30 is not provided in a part of the region in which the glove main body 10 and the film 20 face each other.
Glove Main Body
Examples of a constituent yarn of the glove main body 10 include a cotton yarn, an acrylic yarn, a nylon yarn, a polyester yarn, a rayon yarn, an ultra-high molecular weight polyethylene yarn (HPPE), a metal fiber yarn, a glass fiber yarn, a conductive fiber yarn, a composite yarn thereof, and the like. Furthermore, as a form of the constituent yarn, a spun yarn, a straight yarn or crimped yarn of filaments, a covering yarn, a design twisted yarn, or the like may be employed. A thickness of the constituent yarn (in the case of a composite yarn, a thickness in a state in which all yarns are combined) may be a thickness corresponding to no less than 50 dtex and no greater than 1,500 dtex.
Knitting of the glove main body 10 is not particularly limited, and the glove main body 10 may be knitted into a glove shape by pile knitting, seamless knitting, or sewing cloth such as non-woven fabric or the like.
Film
As described above, the film 20 contains the rubber or the resin as the principal component. The rubber is exemplified by a natural rubber (NR) and a synthetic rubber. Examples of the synthetic rubber include a nitrite butadiene rubber (NBR), a chloroprene rubber (CR), a styrene butadiene rubber (SBR), an isoprene rubber (IR), a butyl rubber (IIR), modified products thereof, and the like. Furthermore, the resin is exemplified by a vinyl chloride resin, polyurethane, an acrylic resin, modified products thereof, and the like. With regard to the rubber or the resin, one type may be used, or two or more types may be used.
The principal component of the film 20 is preferably the rubber, and particularly, a natural rubber and a nitrite butadiene rubber are more preferred. By thus using a natural rubber or a nitrile butadiene rubber as the principal component of the film 20, the strength, flexibility, and manufacturing cost of the film 20 can be well balanced.
The film 20 may contain various types of additives such as a vulcanizing agent, a cross-linker, a pigment, a wax, a thickening agent, and the like as necessary.
The lower limit of an average thickness of the film 20 is preferably 0.1 mm, and more preferably 0.15 mm. Meanwhile, the upper limit of the average thickness of the film 20 is preferably 0.7 mm, more preferably 0.6 mm, and still more preferably 0.5 mm. When the average thickness of the film 20 is less than the lower limit, abrasion resistance of the film 20 may decrease. Conversely, when the average thickness of the film 20 is greater than the upper limit, the flexibility of the glove 1 may be insufficient.
Adhesive Portion
As illustrated in FIG. 2, the adhesive portion 30 includes: a pressure-sensitive adhesive layer 31 in contact with the film 20; and an adhesive layer 32 which is in contact with the glove main body 10 and is constituted by a hot-melt adhesive. In the glove 1, the adhesive portion 30 is constituted by two layers, being the pressure-sensitive adhesive layer 31 and the adhesive layer 32, and does not include another layer between the pressure-sensitive adhesive layer 31 and the adhesive layer 32. By thus not including another layer between the pressure-sensitive adhesive layer 31 and the adhesive layer 32 of the adhesive portion 30, the flexibility of the glove 1 can be increased while maintaining the adhesive strength. Furthermore, the glove 1 is improved in followability and thus becomes resistant to a torsional load.

The adhesive portion 30 may be provided in an entirety of a facing region in which the glove main body 10 and the film 20 face each other, or may be provided in a part of the facing region. In the case in which the adhesive portion 30 is provided in a part of the facing region, the adhesive portion 30 is preferably provided in at least fingertip regions of the first to fifth fingers on the palm side, boundary regions between the palm and the first to fifth fingers, and a palm region. By bonding these regions, misalignment between the glove main body 10 and the film 20 can be effectively inhibited. In particular, providing the adhesive portion 30 in finger base parts included in the boundary regions between the palm and the first to fifth fingers is effective for preventing the misalignment.

Pressure-Sensitive Adhesive Layer

A pressure-sensitive adhesive which constitutes the pressure-sensitive adhesive layer 31 is exemplified by a natural rubber (for example, a depolymerized natural rubber), polyurethane, silicone, a poly(meth)acrylic acid ester, and the like. Of these, in light of superior durability, a poly(meth) acrylic acid ester is preferred. The pressure-sensitive adhesive may contain a thickening agent, an antioxidant, a stabilizer, a surfactant, a pigment, and the like as necessary.

To increase the pressure-sensitive adhesive strength between the film 20 and the pressure-sensitive adhesive layer 31, a rubber or a resin may be mixed into the pressure-sensitive adhesive layer 31. The rubber or resin to be mixed is not limited as long as the pressure-sensitive adhesive strength can be increased, and examples thereof include a natural rubber, a synthetic rubber, a vinyl chloride resin, polyurethane, an acrylic resin, and the like. As an indicator for estimating the pressure-sensitive adhesive strength between the film 20 and the pressure-sensitive adhesive layer 31, for example, a solubility parameter may be considered. The rubber or resin to be mixed is preferably selected such that the solubility parameters of the film 20 and the pressure-sensitive adhesive layer 31 are close to each other. Specifically, in the case in which the principal component of the film 20 is the rubber, the pressure-sensitive adhesive layer 31 preferably contains a rubber component identical to that of the film 20. For example, in the case in which a rubber component of the film 20 is an NR, the pressure-sensitive adhesive preferably contains a depolymerized NR component and highly adhesive acrylic (poly (meth)acrylic acid ester), and a mass ratio of the NR component to the highly adhesive acrylic may be no less than 15:85 and no greater than 25:75. On the other hand, when the solubility parameter of the pressure-sensitive adhesive layer 31 is close to the solubility parameter of the film 20, the pressure-sensitive adhesive layer 31 may contain a component different from that of the film 20, or may not contain any additive. For example, in the case in which the rubber component of the film 20 is an NBR, high pressure-sensitive adhesive strength can be obtained without containing the component (NBR) of the film 20 in the pressure-sensitive adhesive layer 31, i.e., with only the highly adhesive acrylic. It is to be noted that the solubility parameter of each material (the rubber or the resin) can be determined, for example, in accordance with "New Edition, Basics of Rubber Technology" (published by THE SOCIETY OF RUBBER SCIENCE AND TECHNOLOGY, JAPAN).

In the case in which the pressure-sensitive adhesive layer 31 contains the rubber component, the lower limit of a content of the rubber component in the pressure-sensitive adhesive layer 31 (solid content) is preferably 10% by mass, and more preferably 20% by mass. Meanwhile, the upper limit of the content of the rubber component is preferably 60% by mass, and more preferably 50% by mass. When the component identical to the principal component of the film 20 is thus contained in the pressure-sensitive adhesive layer 31 within the above-mentioned range, the pressure-sensitive adhesive strength with respect to the film 20 can be increased. When the content of the rubber component is less than the lower limit, the effect of increasing the pressure-sensitive adhesive strength may be insufficient. Conversely, when the content of the rubber component is greater than the upper limit, the adhesive strength with respect to the adhesive layer 32 may decrease, whereby peeling between the pressure-sensitive adhesive layer 31 and the adhesive layer 32 may be likely to occur.

In the case in which the principal component of the film 20 is the resin, the pressure-sensitive adhesive layer 31 may contain a resin component identical to the principal component of the film 20. That is to say, the pressure-sensitive adhesive layer 31 may contain the film component which forms the resin being the principal component of the film 20. A content of the film component in the pressure-sensitive adhesive layer 31 is preferably no less than 10% by mass and no greater than 60% by mass. When the component identical to the principal component of the film 20 is thus contained in the pressure-sensitive adhesive layer 31 within the above-mentioned range, the pressure-sensitive adhesive strength with respect to the film 20 can be increased.

The lower limit of an average thickness of the pressure-sensitive adhesive layer 31 is preferably 20 μm, and more preferably 25 μm. Meanwhile, the upper limit of the average thickness of the pressure-sensitive adhesive layer 31 is preferably 200 μm, and more preferably 100 μm. When the average thickness of the pressure-sensitive adhesive layer 31 is less than the lower limit, the pressure-sensitive adhesive strength with respect to the film 20 may be insufficient. Conversely, when the average thickness of the pressure-sensitive adhesive layer 31 is greater than the upper limit, owing to low thixotropy of the pressure-sensitive adhesive, the pressure-sensitive adhesive is likely to drip during manufacturing of the glove 1, and thus the manufacturing may be difficult.

The lower limit of a ratio of the average thickness of the pressure-sensitive adhesive layer 31 to an average thickness of the adhesive layer 32 is preferably 0.3, and more preferably 0.4. Meanwhile, the upper limit of the ratio of the average thicknesses is preferably 1.5, more preferably 1.2, and still more preferably 1.0. When the ratio of the average thicknesses is less than the lower limit, a decrease in the thickness of the pressure-sensitive adhesive layer 31 may lead to the pressure-sensitive adhesive strength between the pressure-sensitive adhesive layer 31 and the film 20 being insufficient, or an increase in the thickness of the adhesive layer 32 may lead to the flexibility of the glove 1 decreasing. Conversely, when the ratio of the average thicknesses is greater than the upper limit, an increase in the thickness of the pressure-sensitive adhesive layer 31 may make it difficult to manufacture the glove 1, or a decrease in the thickness of the adhesive layer 32 may lead to insufficient adhesive strength between the adhesive layer 32 and the glove main body 10.

Adhesive Layer

The hot-melt adhesive which constitutes the adhesive layer 32 has properties of being, before curing, liquefied by heat at temperatures higher than a melting point, and solidifying when cooled.

Examples of a principal component of the hot-melt adhesive include modified polyethylene-vinyl acetate (EVA), copolymerized polyester, modified polyolefin, polyurethane, a styrene-butadiene rubber (SBS), polyamide, and the like. Of these, modified EVA, copolymerized polyester, modified polyolefin, and polyurethane, with which the adhesive strength between the glove main body 10 and the pressure-sensitive adhesive layer 31 is easily ensured, are preferred.

The lower limit of the melting point of the hot-melt adhesive is preferably 60° C., and more preferably 70° C. Meanwhile, the upper limit of the melting point of the hot-melt adhesive is preferably 140° C., and more preferably 130° C. When the melting point of the hot-melt adhesive is less than the lower limit, the adhesive layer 32 may be likely to peel, e.g., in a high-temperature environment at a time of transporting the glove or in a case of holding a hot object. Conversely, when the melting point of the hot-melt adhesive is greater than the upper limit, a liquefaction temperature at a time of bonding becomes high, and thus the film 20 may deteriorate.

The lower limit of the average thickness of the adhesive layer 32 is preferably 20 μm, and more preferably 30 μm. Meanwhile, the upper limit of the average thickness of the adhesive layer 32 is preferably 200 μm, and more preferably 100 μm. When the average thickness of the adhesive layer 32 is less than the lower limit, the adhesive strength with respect to the glove main body 10 may be insufficient. Conversely, when the average thickness of the adhesive layer 32 is greater than the upper limit, the flexibility of the glove 1 may decrease.

As illustrated in FIG. 2, the glove main body 10 is impregnated with the adhesive layer 32, and it is preferred that the adhesive layer 32 does not penetrate to an inner face of the glove main body 10. By thus impregnating the glove main body 10 with the adhesive layer 32, the adhesive strength can be increased. Meanwhile, due to the adhesive layer 32 not penetrating to the inner face of the glove main body 10, deterioration in texture of the glove 1 can be inhibited. It is to be noted that in the case in which the glove main body 10 is impregnated with the adhesive layer 32, the average thickness of the adhesive layer 32 also includes the thickness of the impregnated part.

Advantages

In the glove 1, the pressure-sensitive adhesive layer 31 bonds the adhesive portion 30 and the film 20 together. The pressure-sensitive adhesive layer 31 is superior in terms of pressure-sensitive adhesive strength with respect to the film 20, and readheres thereto even after peeling, thereby easily maintaining the adhesion between the film 20 and the adhesive portion 30. On the other hand, in the glove 1, since the hot-melt adhesive is used to bond the glove main body 10, which is difficult to bond with the pressure-sensitive adhesive, the adhesive strength between the glove main body 10 and the adhesive portion 30 can be increased. Accordingly, in the glove 1, the glove main body 10 and the film 20 are less likely to peel from each other even when a load, especially a torsional load, is applied.

Furthermore, the present inventors are aware that the adhesive layer 32 has an effect of preventing twisting of the glove main body 10. Moreover, the present inventors surmise that the reason for the pressure-sensitive adhesive layer 31 having high pressure-sensitive adhesive strength is as follows: the pressure-sensitive adhesive layer 31 is present between the film 20, which is a rubber layer or a resin layer, and the adhesive layer 32 and is not exposed to the air, thereby enjoying a force of preventing peeling due to the van der Waals force and/or the atmospheric pressure.

Method for Manufacturing Glove

Figure 2:
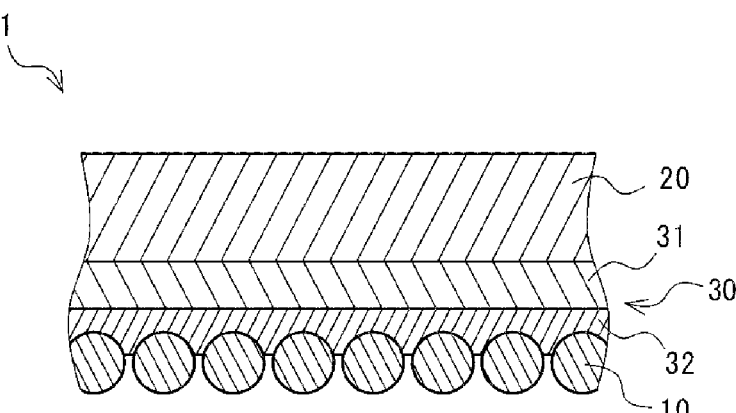
FIG. 2 is a schematic cross-sectional view of a part including a film of the glove in
FIG. 1.
Figure 3:
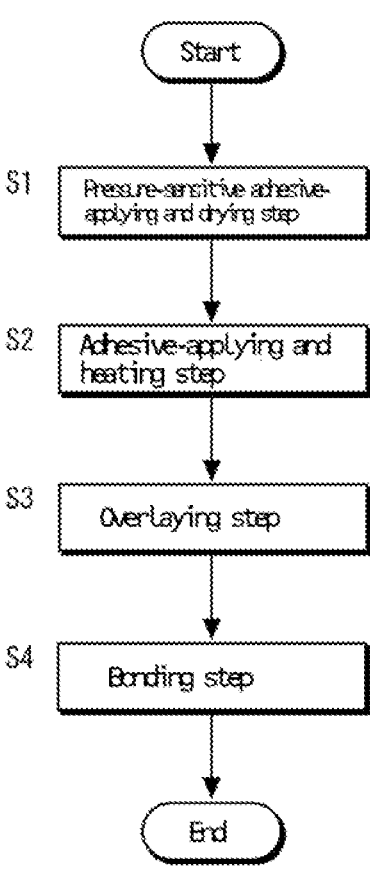
FIG. 3 is a flowchart illustrating a method for manufacturing a glove according to an other embodiment of the present invention.

The method for manufacturing a glove illustrated in FIG. 3 is a method for manufacturing the glove 1 illustrated in FIGS. 1 and 2, the glove 1 including: the glove main body 10 made of fibers; the film 20 which covers at least a part of the outer face of the glove main body 10 and contains the rubber or the resin as the principal component; and the adhesive portion 30 which bonds the glove main body 10 and the film 20 together. The method for manufacturing a glove includes: a pressure-sensitive adhesive-applying and drying step S1; an adhesive-applying and heating step S2; an overlaying step S3; and a bonding step S4.

Pressure-Sensitive Adhesive-Applying and Drying Step

In the pressure-sensitive adhesive-applying and drying step S1, a pressure-sensitive adhesive composition is applied to an inner face of the film 20 and dried. Specifically, this step is carried out by the following procedure. It is to be noted that in the following procedure, a case in which the applying is performed by dipping is described, but the applying may be performed by another method.

Firstly, the film 20 prepared is turned inside out, and put on a hand mold such that the inner face is oriented outward. At this time, the film 20 may be in a cross-linked state or a semi-cross-linked state. By dipping the film 20, being in the semi-cross-linked state, in the pressure-sensitive adhesive, the pressure-sensitive adhesive strength between the pressure-sensitive adhesive layer 31 and the film 20 can be increased. Furthermore, in the case of bringing the film 20 into the cross-linked state, even the film 20 alone can be put on another hand mold, e.g., a slippery hand mold such as a Teflon (registered trademark)—coated mold or the like. The pressure-sensitive adhesive layer 31, the adhesive layer 32 containing the hot-melt adhesive, and the glove main body 10 are sequentially formed on the film 20. Then, the completed glove 1 is released as-is from the hand mold upward from the fingertips in such a manner that the glove 1 is slid over the hand mold without inverting from the cuff. After the releasing, the glove 1 is inverted. In this case, since the completed glove 1 can be released from the hand mold without inverting, the manufacturing is possible even in a case in which the glove main body 10 is thick.

The hand mold on which the film 20 has been put is preferably preheated. Such preheating promotes drying of the pressure-sensitive adhesive composition after the dipping, and enables inhibiting dripping of the pressure-sensitive adhesive composition. The lower limit of a preheating temperature of the hand mold is preferably 20° C., and more preferably 25° C. Meanwhile, the upper limit of the preheating temperature of the hand mold is preferably 70° C., and more preferably 60° C. When the preheating temperature of the hand mold is less than the lower limit, the effect of promoting drying of the pressure-sensitive adhesive composition may not be sufficiently obtained. Conversely, when the preheating temperature of the hand mold is greater than the upper limit, the pressure-sensitive adhesive composition may be repelled by the film 20 at the time of dipping in the pressure-sensitive adhesive composition, and thus it may be difficult to form the pressure-sensitive adhesive layer 31.

Next, the hand mold is dipped in the pressure-sensitive adhesive composition. Here, the pressure-sensitive adhesive composition is a solution obtained by diluting, with water, a solid content necessary for forming the pressure-sensitive adhesive layer 31.

The lower limit of the solid content in the pressure-sensitive adhesive composition is preferably 20% by mass, and more preferably 25% by mass. Meanwhile, the upper limit of the solid content is preferably 60% by mass, and more preferably 50% by mass. When the solid content is less than the lower limit, the amount of a pressure-sensitive adhesive component may be insufficient, whereby the pressure-sensitive adhesive strength may decrease. Conversely, when the solid content is greater than the upper limit, the flexibility of the glove 1 may decrease.

A liquid temperature of the pressure-sensitive adhesive composition is preferably no less than 20° C. and no greater than 45° C. When the liquid temperature of the pressure-sensitive adhesive composition is less than the lower limit, sufficient drying may not be enabled. Conversely, when the liquid temperature of the pressure-sensitive adhesive composition is greater than the upper limit, the pressure-sensitive adhesive composition may deteriorate, whereby the pressure-sensitive adhesive layer 31 may not sufficiently function. It is to be noted that dipping time in the pressure-sensitive adhesive composition can be determined in accordance with a desired amount of the pressure-sensitive adhesive composition to be deposited, a desired thickness of the pressure-sensitive adhesive layer 31, and the like.

After the dipping, the pressure-sensitive adhesive composition is dried to evaporate moisture. Drying conditions are not particularly limited as long as moisture can be evaporated, and a drying temperature is preferably no less than 25° C. and no greater than 90° C., and a drying time is preferably no less than 10 min and no greater than 3 hrs.

After drying the pressure-sensitive adhesive composition, the hand mold is cooled. The cooling may be performed by natural cooling, and may be performed by air cooling or water cooling. It is to be noted that in the case of water cooling, excess water is removed, e.g., by blowing off. A temperature of the hand mold after the cooling is preferably no greater than 30° C. The temperature of the hand mold after the cooling being no greater than the upper limit enables inhibiting excessive deposition of the hot-melt adhesive in the adhesive-applying and heating step S2.

Adhesive-Applying and Heating Step

In the adhesive-applying and heating step S2, the hot-melt adhesive is applied to a surface of the pressure-sensitive adhesive layer 31 having been formed in the pressure-sensitive adhesive-applying and drying step S1, and is heated. Specifically, this step is carried out by the following procedure. It is to be noted that in the following procedure, a case in which the applying is performed by deposition and heat melting is performed is described, but a method may be employed in which the applying is performed by dipping in an aqueous adhesive, followed by drying and heating.

In the adhesive-applying and heating step S2, firstly, the hot-melt adhesive is deposited on the surface of the pressure-sensitive adhesive layer 31 having been formed in the pressure-sensitive adhesive-applying and drying step S1.

Examples of a method for depositing the hot-melt adhesive include fluid dipping, spray coating, melt dipping, and the like. Of these, fluid dipping or spray coating, each of which enables controlling the adhesive layer 32 to be uniform, is preferably employed.

In the fluid dipping, a hot-melt powder is uniformly and thinly deposited on the surface of the pressure-sensitive adhesive layer 31. At this time, the powder that has been excessively deposited on a hand mold surface and the surface of the pressure-sensitive adhesive layer 31 is removed to improve uniformity.

In the spray coating, the hot-melt powder is uniformly and thinly sprayed on the surface of the pressure-sensitive adhesive layer 31. At this time, the powder that has been excessively deposited on the hand mold surface and the surface of the pressure-sensitive adhesive layer 31 is removed to improve uniformity.

The lower limit of a particle diameter D90 of the powder at which a cumulative mass thereof reaches 90% is preferably 40 μm, and more preferably 50 μm. Meanwhile, the upper limit of the particle diameter D90 is preferably 200 μm, and more preferably 180 μm. When the particle diameter D90 is less than the lower limit, the adhesive strength of the adhesive layer 32 may be insufficient. Conversely, when the particle diameter D90 is greater than the upper limit, the adhesive layer 32 may become excessively thick, leading to the flexibility of the glove 1 to be manufactured being insufficient.

Next, the hot-melt adhesive is heated and melted.

Specifically, the powder is melted to form the adhesive layer 32 on the surface of the pressure-sensitive adhesive layer 31. A heating temperature at this time should be no less than a melting temperature of the powder, and is preferably no greater than 140° C. to avoid deterioration of the film 20. Heating time should be sufficient for forming the adhesive layer 32, and may be, for example, no less than 10 min and no greater than 60 min.

After that, the hand mold is cooled. The cooling may be performed by natural cooling, and may be performed by air cooling or water cooling. The temperature of the hand mold after the cooling is preferably no greater than 30° C. By decreasing the temperature of the adhesive layer 32, a surface of the adhesive layer 32 becomes slippery, and thus the glove main body 10 can be easily overlaid thereon. It is to be noted that in light of productivity, time for the cooling is preferably no less than 3 min and no greater than 40 min. In this manner, the adhesive portion 30 in which the pressure-sensitive adhesive layer 31 and the adhesive layer 32 are laminated is formed.

Overlaying Step

In the overlaying step S3, the film 20 and the glove main body 10 are overlaid after the adhesive-applying and heating step S2.

Specifically, the glove main body 10 is turned inside out such that the inner face is oriented outward, and is put on the film 20 on the hand mold with the adhesive portion 30 interposed therebetween. At this time, leaching of the pressure-sensitive adhesive layer 31 is preferably performed by water washing, while positioning. Due to being wetted by the water, slipperiness between the glove main body 10 and the film 20 and between the glove main body 10 and the adhesive portion 30 is improved, facilitating the positioning.

After that, hot-water washing is performed. The hot-water washing enables causing the glove main body 10 to contract and fit easily. Furthermore, the hot-water washing also serves a function of leaching of the glove main body 10. Conditions for the hot-water washing may be, for example, no less than 60° C. and no greater than 90° C., and no less than 15 sec and no greater than 25 sec.

Bonding Step

In the bonding step S4, the film 20 and the glove main body 10 are bonded together by heating after the overlaying step S3. By the heating, the hot-melt adhesive is reliquefied to bond the glove main body 10 and the pressure-sensitive adhesive layer 31 together. Furthermore, moisture contained in the glove main body 10 and the like due to the leaching in the overlaying step S3 is evaporated.

A heating temperature at this time should be no less than a melting temperature of the hot-melt adhesive, and the upper limit of the heating temperature is preferably 140° C., and more preferably 130° C. to avoid deterioration of the film 20. Heating time is preferably no less than 15 min and no greater than 60 min. When the heating time is less than the lower limit, adhesion between the film 20 and the glove main body 10 may be insufficient. Conversely, when the heating time is greater than the upper limit, the film 20 may deteriorate. Furthermore, the hot-melt adhesive may penetrate to the inner face side of the glove main body 10, leading to deterioration in the texture of the glove 1.

After the heating, the glove 1 is inverted and released from the hand mold after the hot-melt adhesive is sufficiently solidified. As necessary, the cuff portion 1c is cut, and a bias tape is sewn. In this manner, the glove 1 can be manufactured.

Advantages

In the method for manufacturing a glove, since the hot-melt adhesive is used to bond the glove main body 10, which is difficult to bond with the pressure-sensitive adhesive, the adhesive strength between the glove main body 10 and the adhesive layer 32 can be increased. Accordingly, in the glove 1 manufactured by the method for manufacturing a glove, peeling is less likely to occur even when a load, especially a torsional load, is applied.

OTHER EMBODIMENTS

The present invention is not limited to the above embodiments and may be carried out in various modified and improved modes in addition to the aforementioned modes.

In the above embodiments, the case in which the adhesive portion of the glove is constituted by the two layers, being the pressure-sensitive adhesive layer and the adhesive layer, is described; however, another layer may be provided between the pressure-sensitive adhesive layer and the adhesive layer.

In the above embodiments, the case in which both the glove main body and the film are formed into a bag shape so as to cover the wearer's palm and dorsal hand is described; however, the film does not need to be formed into a bag shape as long as it covers at least a part of the outer face of the glove main body.

EXAMPLES

Hereafter, the present invention is described further in detail by way of Examples and Comparative Examples; however, the present invention is not limited to the Examples below.

No. 1

The glove main body was knitted using wooly nylon of 210 dtex. Furthermore, the film was produced using an NR rubber latex composition having a blending amount (solid content) shown in Table 1.

TABLE 1

| Blended raw materials | Blending amount (parts by mass) |
|---|---|
| NR latex (LA-TZ, manufactured by SUNWISE) | 100.0 |
| Potassium hydroxide | 1.00 |
| Colloidal sulfur | 1.00 |
| Zinc oxide | 1.00 |
| Vulcanization accelerator (zinc diethyldithiocarbamate) | 0.50 |
| Antioxidant (2,2'-methylenebis(4-ethyl-6-tert-butylphenol)) | 1.00 |
| Microcrystalline wax (VIVASHIELD 9176) | 6.00 |
| Others (inorganic filler, antifoaming agent, thickening agent, and pigment) | 5.00 |

By using the glove main body and the film, a glove of No. 1 was produced according to the above-described method for manufacturing a glove.

As the pressure-sensitive adhesive, "NF13" (mass ratio of poly(meth)acrylic acid ester to depolymerized NR being 80:20), manufactured by Musashino Chemical Corporation, was used, and as the hot-melt adhesive, "PR D60C-P" (principal component: EVA; melting point: 100° C.; particle diameter D90: 63 μm), manufactured by TOYO INK CO., LTD., was used. With regard to the adhesive portion, the average thickness of the pressure-sensitive adhesive layer was 33 μm, and the average thickness of the adhesive layer was 63 μm.

No. 2

A glove of No. 2 was produced in a manner similar to that of No. 1, except that the adhesive portion included only the pressure-sensitive adhesive layer. It is to be noted that the average thickness of the pressure-sensitive adhesive layer was set to 90 μm so as to be equal to the average thickness of the entire adhesive portion of No. 1.

No. 3

A glove of No. 3 was produced in a manner similar to that of No. 1, except that the adhesive portion included only the adhesive layer. It is to be noted that the average thickness of the adhesive layer was set to 92 μm so as to be equal to the average thickness of the entire adhesive portion of No. 1.

No. 4

As No. 4, a commercially available glove was prepared. In this glove, the glove main body was knitted using wooly nylon of 210 dtex, and the film was produced using the rubber latex composition having the blending amount shown in Table 1. The adhesive portion was constituted by a pressure-sensitive adhesive and NaCl; of these, NaCl was dissolved and eliminated by leaching. That is to say, the adhesive portion of No. 4 was constituted by only the pressure-sensitive adhesive. The pressure-sensitive adhesive used for the pressure-sensitive adhesive layer was "NF13," manufactured by Musashino Chemical Corporation, and the average thickness of the adhesive layer was 70 μm.

No. 5

A glove of No. 5 was produced in a manner similar to that of No. 1, except that the pressure-sensitive adhesive layer was "AC100," being a 100% poly(meth)acrylic acid ester.

No. 6

On the glove main body 10 identical to that of No. 1, the film was formed using an NBR rubber latex composition having a blending amount (solid content) shown in Table 2.

TABLE 2

| Blended raw materials | Blending amount (parts by mass) |
|---|---|
| NBR latex (Lx-550, manufactured by Zeon Corporation) | 100.0 |
| Potassium hydroxide | 0.20 |
| Colloidal sulfur | 0.50 |
| Zinc oxide | 2.00 |
| Vulcanization accelerator (zinc diethyldithiocarbamate) | 0.20 |
| Antioxidant (2,2'-methylenebis(4-ethyl-6-tert-butylphenol)) | 0.50 |
| Ammonia | 0.20 |
| Others (inorganic filler, antifoaming agent, thickening agent, and pigment) | 5.00 |

A glove of No. 6 was produced in a manner similar to that of No. 5, except that the above film was used.

Evaluations

The gloves of No. 1 to No. 6 were subjected to a torsion test and a peel test in terms of two cases: a normal state, and a state after dipping in water for 24 hrs.

Torsion Test

The torsion test was conducted by the following procedure. A test piece (fingertip portion, diameter: 18 mm) including the adhesive portion was cut out from each glove. The test piece was brought into contact with water-resistant paper (#1000 sandpaper) (contact site diameter: 10 mm), and a load of 5 kg was applied to the test piece. The test piece in this state was rubbed while being twisted. Specifically, the test piece was rotated a half turn (180° in one direction, and was then rotated a half turn in the opposite direction. The rotational speed at this time was 40 Hz. A unit of the one-direction or opposite-direction half turn was counted as one time, and the number of times at which peeling and floating occurred in a part between the film and the glove main body of the test piece was recorded. The results are shown in Table 3.

Peeling Strength

The peeling strength is a value obtained in such a manner that a test piece having a size of 10 mm wide×60 mm long and including a bonding part between the glove main body and the film was cut out, and by using the test piece, a 180° peel test was conducted at a tensile speed of 50 mm/min and a travel distance of 100 mm, and an average value of peaks of a plurality of mountains and peaks of a plurality of valleys of a load observed in the 180° peel test was divided by an average width of the bonding part. It is to be noted that the "average width of the bonding part" as referred to herein means an average length of the bonding part in the width direction of the test piece. The results are shown in Table 3.

In Table 3, "—" in the field of the "adhesive portion" means that the corresponding layer (the pressure-sensitive adhesive layer or the adhesive layer) was not included. The parentheses in the torsion test mean that the film ruptured before floating occurred between the film and the glove main body. Furthermore, "0 time" in the torsion test means that floating had already occurred before the test.

The results in Table 3 indicate that due to the configuration (No. 1, No. 5, and No. 6) of the adhesive portion including: the pressure-sensitive adhesive layer in contact with the film; and the adhesive layer which is in contact with the glove main body and is constituted by the hot-melt adhesive, a glove can be obtained in which the glove main body and the film are less likely to peel from each other even when a load, especially a torsional load, is applied.

Furthermore, when comparing the gloves of No. 1 and No. 5, in which the rubber component of the film is the NR, it is found that in the glove of No. 1, in which the pressure-sensitive adhesive contains the NR as the rubber component, the glove main body and the film are less likely to peel from each other even when a torsional load is applied especially under the conditions after water dipping. On the other hand, it is found that in the case in which the pressure-sensitive adhesive contains the NBR as the rubber component, high pressure-sensitive adhesive strength can be obtained even with the pressure-sensitive adhesive containing only highly adhesive acrylic.

INDUSTRIAL APPLICABILITY

As described above, in the glove of the present invention, the glove main body and the film are less likely to peel from each other even when a load, especially a torsional load, is applied. Furthermore, the method for manufacturing a glove of the present invention enables manufacturing a glove in which the glove main body and the film are less likely to peel from each other even when a load, especially a torsional load, is applied.

EXPLANATION OF THE REFERENCE SYMBOLS

1 Glove
1a Main body portion
1b Finger portion
1c Cuff portion
10 Glove main body
20 Film
30 Adhesive portion
31 Pressure-sensitive adhesive layer
32 Adhesive layer

TABLE 3

| | | Adhesive portion | | Torsion test | | Peel test | |
|---|---|---|---|---|---|---|---|
| | Film | pressure-sensitive adhesive | adhesive | normal state | after water dipping | normal state | after water dipping |
| No. 1 | NR | NF13 | hot-melt | (290 times) | 20 times | 6N | 3N |
| No. 2 | NR | NF13 | — | 80 times | 10 times | 3N | 0.45N |
| No. 3 | NR | — | hot-melt | 5 times | 5 times | 6N | 4N |
| No. 4 | NR | NF13 + NaCl | — | 10 times | 0 time | 3N | 0.1N |
| No. 5 | NR | AC100 | hot-melt | (290 times) | 15 times | 6N | 3N |
| No. 6 | NBR | AC100 | hot-melt | (180 times) | (30 times) | 4N | 3.5N |

15

16

What is claimed is:

1. A glove comprising:

a glove main body made of fibers;

a film which covers at least a part of an outer face of the glove main body and comprises a rubber or a resin as a principal component; and an adhesive portion which bonds the glove main body and the film together, wherein the adhesive portion comprises:

a pressure-sensitive adhesive layer in contact with the film; and an adhesive layer which is in contact with the glove main body and is constituted by a hot-melt adhesive, and a ratio of an average thickness of the pressure-sensitive adhesive layer to an average thickness of the adhesive layer is no less than 0.3 and no greater than 1.0, and the adhesive portion is provided in an entirety of a facing region in which the glove main body and the film face each other.

2. The glove according to claim 1, wherein the adhesive portion does not comprise another layer between the pressure-sensitive adhesive layer and the adhesive layer.

3. The glove according to claim 1, wherein:

the average thickness of the pressure-sensitive adhesive layer is no less than 20 μm and no greater than 200 μm, and the average thickness of the adhesive layer is no less than 20 μm and no greater than 200 μm.

* * * * *